United States Patent
Tsai et al.

[11] 3,734,227
[45] May 22, 1973

[54] STEERING GEAR OF FOUR-WHEEL TRACTOR

[76] Inventors: Grigory Tsai, "Kirda", Saime ulitsa Sadovaya, 10, kv. 12; Richard Fedorovich Perikov, "Kirda", Saime ulitsa Sadovaya, 13, kv. 4, both of Yangijul Tashkentskoi oblasti; Mikhail Stepanovich Pak, 4 Mikroraion, 42, kv. 56, Frunze; Saidikarim Sultanov, "Kirda", Saime ulitsa Tsentralnaya, 9, Yangijul Tashkentskoi oblasti; German Ivanovich Grishenkov, "Kirda", Saime, ulitsa Samarkandskaya, 72, kv. 9, Yangijul Tashkentskoi oblasti; Kuchkarali Tulaganovich Shakirov, "Kirda", Saime ulitsa Sadovaya, 7, Yangijul Tashkentskoi oblasti, all of U.S.S.R.

[22] Filed: Jan. 13, 1972

[21] Appl. No.: 217,520

[30] Foreign Application Priority Data

Jan. 29, 1971 U.S.S.R. ............................ 1613167

[52] U.S. Cl. .................... 180/79.2 R, 280/91, 280/96
[51] Int. Cl. ............................................. B62d 5/06
[58] Field of Search ...................... 180/79.2 R, 79.4; 280/87 R, 91, 96, 97

[56] References Cited
UNITED STATES PATENTS

| 2,105,473 | 1/1938 | Dean | 180/79.2 R X |
| 3,315,759 | 4/1967 | Bohlen | 280/91 X |

FOREIGN PATENTS OR APPLICATIONS

| 446,718 | 5/1936 | Great Britain | 280/87 R |

Primary Examiner—Leo Friaglia
Assistant Examiner—Leslie J. Paperner
Attorney—Holman & Stern

[57] ABSTRACT

A steering gear wherein the steering shaft is alternately connected via a hydraulic servo unit and a shift coupling with a steering linkage and with a gear speed reducer installed on a shaft articulated to the front axle of the tractor.

The drive shaft is installed in the housing coaxially with a shaft connected with the front axle. The drive shaft carries a gear rigidly connected with the pitman arm while the other shaft carries a planetary speed reducer with an external gear. The shift coupling consists of two coaxial sleeves provided with gear rims at the end and interconnected for joint axial movement. The inner sleeve is installed on the drive shaft and meshes alternately with said gears while the outer sleeve is connected to the housing with a freedom of axial movement and meshes with said gears for alternate locking of the front axle and steering linkage.

1 Claim, 3 Drawing Figures

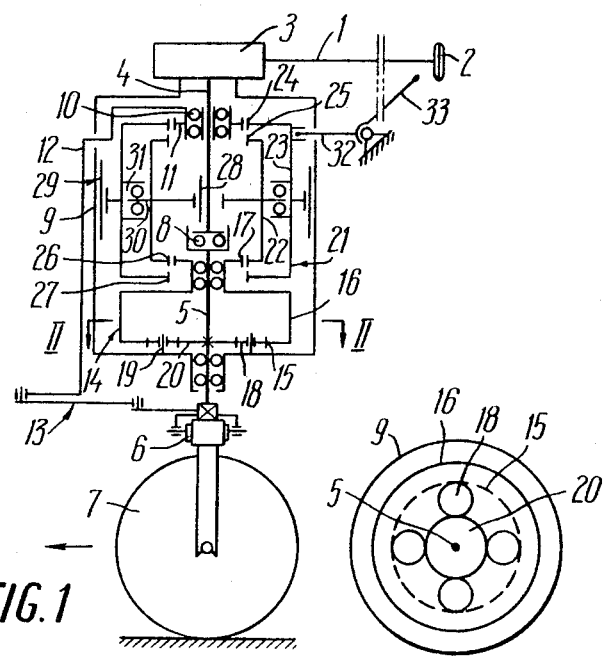
FIG.1
FIG.2
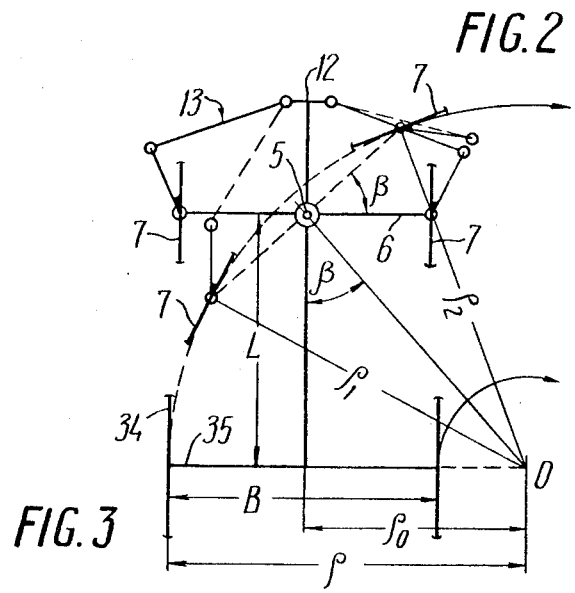
FIG.3

STEERING GEAR OF FOUR-WHEEL TRACTOR

The present invention relates to the tractor-building industry and more specifically it relates to the steering gear of four-wheel tractors whose front axle is capable of turning so as to align the tracks of the steerable wheels on turns with the track of the outer driving wheel.

Known in the art is the steering gear of a four-wheel tractor wherein the steering shaft is divided in the plane perpendicular to its longitudinal axis. One end of this shaft is mounted with a steering wheel while the other end is fitted with a worm gear drive whose drive shaft carries the pitman arm of the steering linkage.

Installed before the worm gear drive on the steering shaft is a gear speed reducer connected via bevel gear drives and a hydraulic servo unit with the shaft which is articulated to the tractor front axle for turning the latter. The hydraulic servo unit consists of a hydraulic selector and hydraulic cylinders.

At the jointing point of the steering shaft there is a shift coupling intended for alternate connection of the steering shaft with the steering linkage and with the front axle for turning it while changing the direction of tractor movement.

The shift coupling consists of a movable member and a fixed member. The fixed coupling member is rigidly secured on the steering shaft at the side of the worm gear drive. The movable coupling member is provided with a gear rim and is installed on the steering shaft at the steering wheel side with a provision for axial movement.

When the coupling members are engaged, the steering linkage is connected for turning the steerable wheels; when they are disengaged, the gear rim of the movable coupling member comes in mesh with a spur gear whose hub carries a rigidly secured driving bevel pinion which is in constant mesh with a driven bevel gear connected with the hydraulic selector via a crankshaft.

The coupling members are engaged and disengaged by a rod one end of which is connected to the movable coupling member while the other end is articulated to a control lever in the driver's cab.

The above-described design of the steering gear for turning the front axle and pitman arm of the tractor fails to ensure dependable steering since it has no provision for reliable locking of the steering linkage and front axle when they are alternately set in operation.

An object of the present invention is to provide for reliable alternate locking of the steering linkage and front axle of the tractor so as to lock the steering linkage on turns and to lock its front axle during straight-ahead motion.

In accordance with this and other objects we hereby claim a steering gear of a four-wheel tractor wherein the steering shaft carrying a steering wheel on one end has a hydraulic servo unit at the other end, said servo unit incorporating a drive shaft set at an angle to the steering shaft; said steering shaft can be connected by a shift coupling either with the pitman arm or with a gear speed reducer connected to a shaft which is articulated to the front axle of the tractor for turning it when the direction of tractor movement is changed and wherein, according to the invention, the drive shaft of the hydraulic servo unit and the shaft articulated to the front axle are coaxially installed in the housing, one after the other; the drive shaft carries a gear capable of rotating around said shaft and rigidly connected with the pitman arm while the other shaft carries a planetary gear speed reducer with an external gear, the shift coupling consisting of two coaxial sleeves with gear rims at the ends, said sleeves being connected to each other for joint synchronous axial movement; the inner sleeve is installed on the drive shaft with a provision for axial movement and can be meshed alternately with the gear connected to the pitman arm or with the speed reducer gear for turning the front axle of the tractor while the outer sleeve is connected with said housing movable in the axial direction and, being alternately engaged with the speed reducer gear or with the gear connected to the pitman arm locks and gears against turning.

The steering gear of a four-wheel tractor realized according to the present invention is comparatively simple in manufacture and operation and ensures reliable locking of the steering linkage and front axle of the tractor both during engagement and operation.

Now the invention will be described in detail by way of example with reference to the accompanying drawings, in which:

FIG. 1 is a kinematic diagram of the steering linkage of a four-wheel tractor according to the invention;

FIG. 2 is a section taken along line II—II in FIG. 1;

FIG. 3 is a turning diagram of a four-wheel tractor.

The steering gear of a four-wheel tractor comprises a steering shaft 1 (FIG. 1) one end of which carries a steering wheel 2 and the other end is mounted with a hydraulic servo unit 3 whose drive shaft 4 is set at an angle to the steering shaft 1. Installed coaxially with the drive shaft 4 is a shaft 5 articulated to the front axle 6 on which steerable wheels 7 are mounted. These shafts are arranges so that the end of the drive shaft 4 rests on the shaft 5 with the aid of a thrust bearing 8. The joint of this type allows the shaft 5 to stay immovable during rotation of the drive shaft 4.

The shafts 4 and 5 are located in a housing 9 secured on the hydraulic servo unit 3. The housing can also be mounted on the tractor frame (not shown in the drawings).

Mounted on the drive shaft 4 with the aid of bearings 10 is a gear 11 rigidly fastened to the pitman arm 12 of the steering linkage 13.

The shaft 5 carries a planetary speed reducer 14 comprising a sun gear 15 (FIGS. 1, 2) whose hub 16 carries an external gear 17.

The sun gear 15 is connected with a gear 20 mounted on the shaft 5 via planet pinions 18 whose rotation axle 19 is secured on the housing 9.

The drive shaft 4 is provided with a shift coupling 24 which consists of two coaxial sleeves 22 and 23.

The ends of these sleeves have gear rims 24, 25 and 26, 27 with identical pitch circle diameters. These gear rims are designed for alternate meshing with the gears 11 and 17, respectively, of the pitman arm 12 and of the speed reducer 14 for their turning and locking.

The inner sleeve 22 is installed on the drive shaft 4 with the aid of splines 28 which allows it to move axially along the shaft 4 and rotate together with it.

The outer sleeve 23 is installed in the housing 9 by means of a splined joint 29 which permits its axial movement only.

The sleeve 22 has an annular shoulder 30 entering a slot 31 of the outer sleeve 23. Such a jointing of the inner and outer sleeves 22 and 23 provides for their joint synchronous movement in the axial direction.

The coupling 21 can be moved from one extreme position to the other by means of a rod 32 and a lever 33, the latter being installed in the driver's cab.

The steering gear of a four-wheel tractor functions as follows.

The position of the lever 33 shown in FIG. 1 corresponds to turning of the tractor. The coupling 21 is in the downmost position. Meanwhile, the gear 24 of the sleeve 23 meshes with the gear 11 of the pitman arm 12 while the gear 26 of the inner sleeve 22 is in engagement with the gear 17.

Rotating the steering wheel 2 turns the steering shaft 1 and transmits rotation to the drive shaft via the hydraulic servo unit 3.

The inner sleeve 22, the gear 17 meshing with it and, as a consequence, the sun gear 15 rotate together with the drive shaft 4. Rotation of the sun gear 15 is transmitted via the planet pinions 18 to the gear 20 which is rigidly secured on the shaft 5 so that the shaft 5 connected with the front axle turns horizontally in the direction contrary to the rotation of the steering shaft 1 through an angle $\beta$ (FIG. 3). The turning angle $\beta$ of the front axle 6 is limited by a stop (not shown) secured to the tractor frame (not shown).

The turning angle $\beta$ of the front axle 6 with L = 1.1 B where L = tractor wheel base and B = track width is determined on the assumption that the radius $\rho$ of turning of the outer driving wheel 34 is equal to the turning radiuses $\rho_1$ and $\rho_2$ of the steerable wheels 7. $\rho = \rho_1 = \rho_2$ If these conditions are satisfied, the angle $\beta$ is determined by the formula $\beta = \arctan(\rho_o/2)$, where: $\rho_o =$ distance from the center O of tractor turning to the middle of the tractor driving axle 35. If this condition is satisfied, the path of the tractor front wheels 7 on turning the tractor will coincide with the path of its outer driving wheel 34.

Turning of the front axle 6 is a vertical direction is ensured by its articulated jointing with the shaft 5.

Meanwhile, the gear 11 of the pitman arm 12 meshes with the gear 24 of the outer sleeve 23 so that the steering linkage 13 is locked against turning while the tractor changes its direction of travelling.

Inorder to shift the tractor back to straight-ahead motion, the steering wheel 2 is rotated in the opposite direction so as to return the front axle 6 to the initial position. Then the coupling 21 is brought to the uppermost position by the lever 33. The gear 25 of the sleeve 22 engages the gear 11 of the pitman arm 12 while the gear 27 of the outer sleeve 23 engages the gear 17. Thus, the planetary speed reducer is locked in position and the front axle 6 of the tractor occupies its initial position.

Turning the steering wheel 2 rotates the steering shaft 1 and this rotation is transmitted via the hydraulic servo unit 3 to the drive shaft 4. Rotating together with the shaft 4, the inner sleeve 22 drives the gear 11 and, consequently, moves the pitman arm 12 and the steering linkage 13 connected with the steerable wheels 7 of the tractor.

What is claimed is:

1. A steering gear of a four-wheel tractor with a turning front axle comprising: a steering shaft; a steering wheel mounted on one end of said steering shaft; a hydraulic servo unit located on the other end of said steering shaft; a drive shaft of said hydraulic servo unit set an angle to said steering shaft; a gear mounted on said drive shaft; a pitman arm rigidly connected with said gear; a steering linkage connected to said pitman arm and to the steerable wheels of said tractor; a shaft articulated to said front axle and installed coaxially with said drive shaft; a planetary speed reducer mounted on said shaft which is articulated to the front axle for turning the latter; an external gear mounted on said speed reducer; a housing secured on a stationary element of said tractor and accommodating said shafts; a shift coupling intended for alternate connection of said steering shaft with said steering linkage and said speed reducer; said shift coupling consists of an inner sleeve mounted on the drive shaft with a freedom of axial movement, gear rims secured on the ends of said inner sleeve and meshing alternately with said gear connected with said pitman arm for turning said steering linkage and with said gear of said speed reducer for turning said front axle of the tractor, an outer sleeve installed on said housing with a freedom of axial movement and connected with said inner sleeve for joint synchronous axial movement, gear rims secured on the ends of said outer sleeves and meshing alternately with said gear of said speed reducer for locking the front axle against turning and with said gear connected to said pitman arm for locking the steering linkage against turning.

* * * * *